(12) United States Patent
Wu

(10) Patent No.: US 7,036,171 B2
(45) Date of Patent: May 2, 2006

(54) AIR MATTRESS CONTROL UNIT

(75) Inventor: Shang-Neng Wu, Taipei (TW)

(73) Assignee: Sunflower Medical, LLC, Ellis, KS (US)

( * ) Notice: Subject to any disclaimer, the term of this patent is extended or adjusted under 35 U.S.C. 154(b) by 0 days.

(21) Appl. No.: 10/790,603

(22) Filed: Mar. 2, 2004

(65) Prior Publication Data

US 2004/0163181 A1    Aug. 26, 2004

Related U.S. Application Data

(63) Continuation of application No. 10/106,637, filed on Mar. 26, 2002, now Pat. No. 6,698,046.

(60) Provisional application No. 60/278,925, filed on Mar. 26, 2001, provisional application No. 60/292,090, filed on May 17, 2001.

(51) Int. Cl.
*A47C 27/10* (2006.01)
*F16K 3/26* (2006.01)

(52) U.S. Cl. .................. 5/713; 5/706; 137/625.15; 137/625.21

(58) Field of Classification Search .................. 5/713, 5/710, 706; 137/625.13, 625.15, 625.21, 137/487.5
See application file for complete search history.

(56) References Cited

U.S. PATENT DOCUMENTS

| 4,197,837 A | * | 4/1980 | Tringali et al. ............. 601/150 |
|---|---|---|---|
| 4,745,647 A | | 5/1988 | Goodwin |
| 4,768,249 A | | 9/1988 | Goodwin |
| 4,797,962 A | | 1/1989 | Goode |
| 4,947,500 A | | 8/1990 | Seiler |
| 4,949,412 A | | 8/1990 | Goode |
| 4,949,413 A | | 8/1990 | Goodwin |
| 4,949,414 A | | 8/1990 | Thomas et al. |
| 4,993,920 A | | 2/1991 | Harkleroad et al. |
| 5,003,654 A | | 4/1991 | Vrzalik |
| 5,005,240 A | | 4/1991 | Vrzalik |
| 5,044,029 A | | 9/1991 | Vrzalik |
| 5,051,673 A | | 9/1991 | Goodwin |
| 5,052,067 A | | 10/1991 | Thomas et al. |
| 5,062,167 A | | 11/1991 | Thomas et al. |
| 5,065,466 A | * | 11/1991 | Thomas et al. ................. 5/713 |
| 5,073,999 A | | 12/1991 | Thomas et al. |
| 5,090,077 A | | 2/1992 | Caden et al. |
| 5,092,007 A | | 3/1992 | Hasty |
| 5,095,568 A | | 3/1992 | Thomas et al. |
| 5,117,518 A | | 6/1992 | Schild |
| 5,121,513 A | | 6/1992 | Thomas et al. |
| 5,138,729 A | | 8/1992 | Ferrand |
| 5,142,719 A | | 9/1992 | Vrzalik |
| 5,152,021 A | | 10/1992 | Vrzalik |
| 5,152,319 A | | 10/1992 | Hannagan et al. |

(Continued)

*Primary Examiner*—Robert G. Santos
(74) *Attorney, Agent, or Firm*—Spencer, Fane, Britt & Browne, LLC

(57) ABSTRACT

The system of the present invention is a system for supplying air and controlling the flow of air into and out of the chambers of a patient supporting air mattress. It includes an electric motor powered variable speed blower, a two position rotary valve, air mattress supply lines communicating between the rotary valve and the chambers of the air mattress, a continuous exhaust line also connected to the rotary valve, stepper motor controlled valves in the air mattress supply lines, pressure sensors between the stepper motor controlled valves and the chambers of the air mattress and a control unit for controlling the stepper motor controlled valves to control the amount by which the chambers of the air mattress are inflated.

22 Claims, 2 Drawing Sheets

U.S. PATENT DOCUMENTS

| | | |
|---|---|---|
| 5,182,826 A | 2/1993 | Thomas et al. |
| 5,233,974 A | 8/1993 | Senoue et al. |
| 5,243,721 A | 9/1993 | Teasdale |
| 5,251,349 A | 10/1993 | Thomas et al. |
| 5,267,363 A | 12/1993 | Chaffee |
| 5,267,364 A | 12/1993 | Volk |
| 5,272,778 A | 12/1993 | Gore |
| 5,343,893 A | 9/1994 | Hogan et al. |
| 5,349,983 A | 9/1994 | Ozarowski et al. |
| 5,373,595 A * | 12/1994 | Johnson et al. ................. 5/710 |
| 5,375,273 A | 12/1994 | Bodine, Jr. et al. |
| 5,394,577 A | 3/1995 | James et al. |
| 5,606,754 A * | 3/1997 | Hand et al. .................... 5/713 |
| 5,619,764 A | 4/1997 | Lopau |
| 5,774,917 A | 7/1998 | Liu |
| 5,920,934 A * | 7/1999 | Hannagan et al. ............. 5/713 |
| 5,947,168 A | 9/1999 | Viard |
| 6,058,538 A * | 5/2000 | Chapman et al. ............... 5/713 |
| 6,098,222 A * | 8/2000 | Hand et al. .................... 5/713 |
| 6,108,843 A | 8/2000 | Suzuki et al. |
| 6,115,860 A | 9/2000 | Vrzalik |
| 6,152,176 A * | 11/2000 | Lin ........................ 137/625.21 |
| 6,253,402 B1 * | 7/2001 | Lin ................................ 5/713 |
| 6,257,269 B1 | 7/2001 | Wu |
| 6,266,833 B1 * | 7/2001 | Lin ................................ 5/713 |
| 6,415,814 B1 * | 7/2002 | Hand et al. ............... 137/487.5 |
| 6,571,825 B1 * | 6/2003 | Stacy .................... 137/624.13 |
| 6,698,046 B1 * | 3/2004 | Wu ................................ 5/713 |
| 6,832,629 B1 * | 12/2004 | Wu ....................... 137/625.21 |
| 6,832,630 B1 * | 12/2004 | Wu ....................... 137/625.21 |
| 2002/0195144 A1 * | 12/2002 | Hand et al. ............... 137/487.5 |
| 2004/0163181 A1 * | 8/2004 | Wu ................................ 5/713 |

* cited by examiner

AIR MATTRESS CONTROL UNIT

CROSS REFERENCES TO RELATED APPLICATIONS

This application is a continuation of U.S. Non-Provisional Utility Patent Application Ser. No. 10/106,637 filed 26 Mar. 2002 now U.S. Pat. No. 6,698,046.

U.S. Non-Provisional Utility Application Ser. No. 10/106,637 claimed the benefit of U.S. Provisional Patent Application No. 60/278,925 filed 26 Mar. 2001 and U.S. Provisional Patent Application 60/292,090 filed 17 May 2001.

FIELD OF THE INVENTION

This invention relates to a control system for controlling the flow of air to and from the chambers of a low air loss, patient supporting air mattress.

BACKGROUND OF THE INVENTION

Numerous systems have been proposed for controlling the flow of air to a low air loss inflatable air mattress. For example, Suzuki et al., in U.S. Pat. No. 6,108,843 employed a set of on/off valves in combination with pressure sensors to control pressures within a set of air sacks of an air mattress. Schild, in U.S. Pat. No. 5,117,518 discloses a rotating valve to alternately supply air to sets of air chambers in an air mattress. Thomas et, al, in U.S. Pat. No. 5,095,568 teach a flat plate valve system for distributing air to an air mattress.

The prior art evidences a search for a simple, reliable and compact means for providing a flow of air to the chambers of a low air loss air mattress. Numerous complex valves for controlling the flow of air have been developed.

One object of the present invention is to provide a simple, compact air mattress air supply and control system that is able to operate in different modes to supply air to different types of air mattresses.

Another object of the present invention is to provide an air mattress air supply and control system having a fan and motor that will not over heat as is now the case with many existing systems.

Yet another object of the present invention is to provide an air mattress air supply and control system that can receive an input corresponding to the weight of the supported patient, sense pressure in the chambers of various zones of the mattress, convert those sensed pressures to interface pressures between the patient and the mattress depending on the location of the zone and weight of the patent and then control the flow of air to an air mattress so that the patient/mattress interface pressure in each zone remains below a selected value to prevent the formation of bed sores.

Still yet another object of the present invention is to provide an air mattress air supply and control system that can be quickly deflated with reverse air flow so that cardiopulmonary resuscitation can be administered to a patient supported by the mattress.

BRIEF DESCRIPTION OF THE INVENTION

The system of the present invention is a system for supplying air and controlling the flow of air into and out of the chambers of a patient supporting air mattress. It includes an electric motor powered variable speed blower, a two position rotary valve, air mattress supply lines communicating between the rotary valve and the chambers of the air mattress, a continuous exhaust line also connected to the rotary valve, stepper motor controlled valves in the air mattress supply lines, pressure sensors between the stepper motor controlled valves and the chambers of the air mattress and a control unit.

The variable speed blower has an intake and an exhaust port. The inlet port of the two position rotary valve is connected to the blower exhaust port. The two position rotary valve can either direct the flow of air from the blower to the chambers of the air mattress in a pressurizing mode or route the flow of air from the air mattress into the intake of the blower in a vacuum mode in which the air mattress is rapidly deflated. When in the pressurizing mode, air exits the rotary valve through air mattress supply ports connected to the air mattress supply lines that supply air to various chambers of the air mattress. When in the pressurizing mode, a portion of the air supplied by the blower also flows out of the rotary valve through the continuous exhaust line. The continuous exhaust line provides a passageway for air to continuously flow through the blower to cool the blower. The stepper motor controlled valves in the air mattress supply lines can incrementally close to control the flow of air in the air mattress supply lines. The air pressure sensors which are located between the stepper motor controlled valves and the chambers of the air mattress sense the air pressure in the lines leading to the air mattress. The control unit receives signals from the air pressure sensors and responds to those signals by controlling the operations of the blower and the stepper motor controlled valves in such a way that the air pressure within the air mattress chambers is held within a selected pressure range.

DETAILED DESCRIPTION

Figure 1:
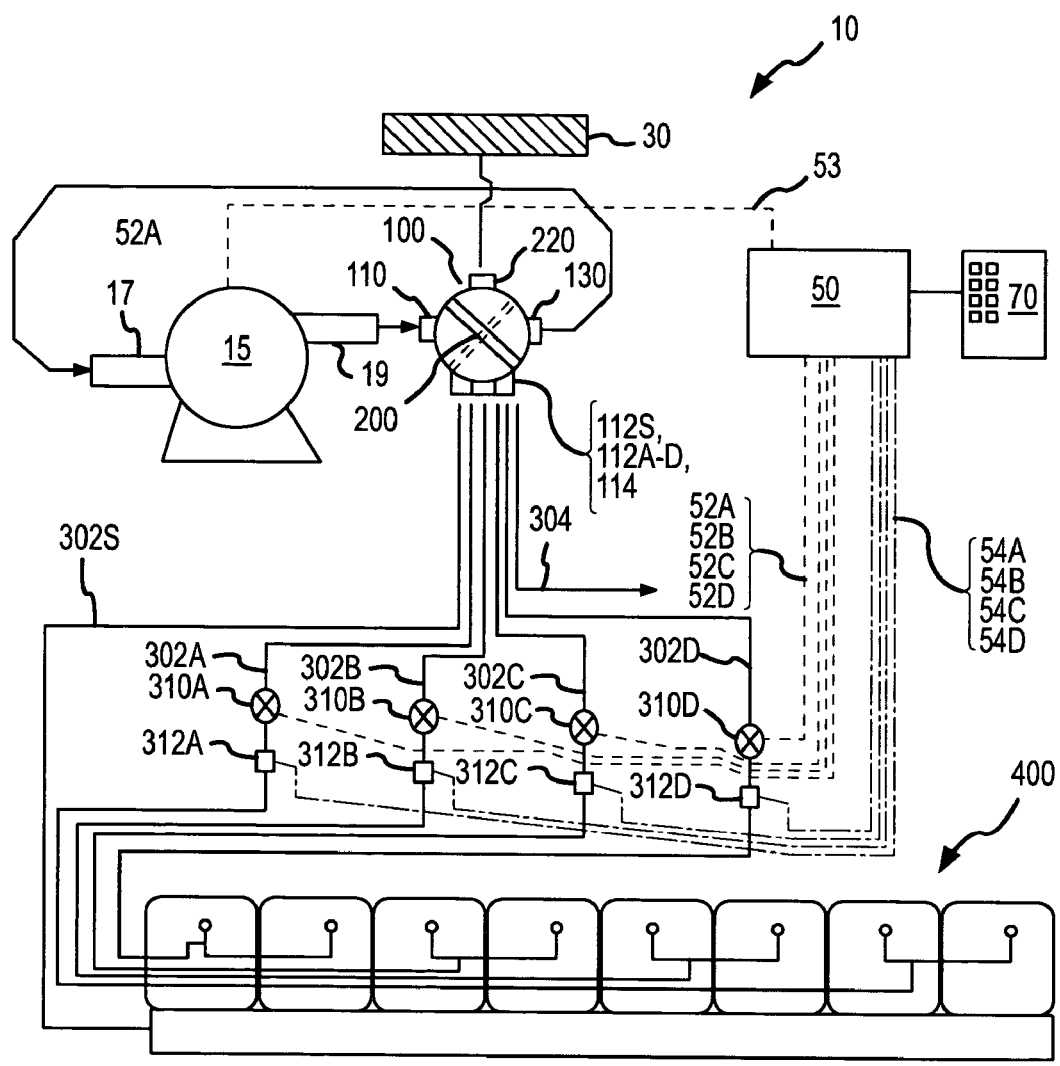
FIG. 1 is a schematic of the system of the present invention.

The system of the present invention is shown on schematic FIG. 1. System 10 includes an electric motor powered blower 15, an intake filter 30, 1 two position-multiport rotary valve 100, air mattress supply lines 302A, 302B, 302C, 302D and 302S for supplying air flow into and out of the internal chamber(s) of an air mattress 400, continuous exhaust line 304, stepper motor controlled valves 310A, 310B, 310C, and 310D, pressure sensors 312A, 312B, 312C, and 312D, a control unit 50 and a control panel 70.

Variable speed blower 15 is powered by an electric motor (not shown) such as a 110V AC electric motor. Control unit 50 can control the power supplied to the blower motor. Blower 15 is a single direction blower that is not a positive displacement air pump but rather a centrifugal fan type blower. This type of blower is appropriate in a system which supplies air to a low air loss air mattress such as air mattress 400. Air mattress 400 has a large number of small holes in its upper surfaces to permit air to constantly circulate around a supported patient.

Blower 15 has an intake port 17 and an exhaust port 19. Rotary valve 100 is shown schematically in FIG. 1 and is shown in greater detail in FIG. 2. and FIG. 3. As is shown in FIG. 1, rotary valve 100 has an inlet port 110 that is in pneumatic communication with exhaust port 19 of blower 15. The blower intake port 17 is connected by an air tight chamber (not shown) to an outlet port 130 in rotary valve 100. As can be seen schematically in FIG. 1, rotary valve 100 includes a gate member 200, which in FIG. 1, is shown in a first position for directing air flow in an inflation direction while in a pressurizing mode. Rotary value 100 has a set of mattress supply ports 112S, 112A, 112B, 112C and 112D as well as a continuous exhaust port 114. Continuous exhaust port 114 connects to a line 304 leading to the outside environment and provides a passageway for air to constantly flow through and cool blower 15. Supply port 112S connects to a line 302S that might be used to inflate a chamber or set of chambers of the air mattress that might remain inflated at a relatively constant pressure. A set of air mattress supply lines 302A, 302B, 302C and 302D connect to mattress supplyports 112A, 112B, 112C and 112D respectively and are each interrupted by control valves 310A, 310B, 310C and 310D and pressure sensors 312A, 312B, 312C and 312D respectively. Although, in the embodiment shown, air mattress supply lines 302A, 302B, 302C and 302D each have a control valve and a sensor, it is possible to configure a system where only some of those supply lines include a control valve and a sensor.

Each of these identical control valve, sensor arrangements can be better understood by considering the control valve, sensor arrangement of air mattress supply line 302A which leads to a chamber or set of chambers in air mattress 400. Pressure sensor 312A, is used to sense the air pressure in line 302A. Control valve 310A controls the flow of air in line 302A between rotary valve 100 and air mattress 400. Control valve 310A includes a stepper motor that incrementally opens and closes valve 310A. Both pressure sensor 312A and control valve 310A are operatively connected to control unit 50 via lines 54A and 52A respectively.

Preferably, control unit 50 is a programmable control unit that can receive inputs from a control panel 70. Control unit 50 is connected to pressure sensors 312A, 312B, 312C and 312D via sensor lines 54A, 54B, 54C and 54D respectively and to pressure control valves 310A, 310B, 310C and 310D via control lines 52A, 52B, 52C and 54D respectively. Preferably, control unit 50 is also be operatively connected to the motor that powers blower 15 via a control line 53. Control unit 50 receives signals from pressure sensors 312A, 312B, 312C and 312D and responds to those signals by sending control signals to the stepper motors of control valves 310A, 310B, 310C and 310D and also, if necessary, by adjusting the amount of power supplied to the motor that powers blower 15.

The operation on one pressure sensor, control valve combination can be considered in order to understand the operation of all four pressure sensor, control valve arrangements. Control unit 50 receives a signal from pressure sensor 312A indicating the air pressure within the set of chambers of air mattress 400 that are supplied by line 302A. Control unit 50 responds to the pressure signal to determine if the pressure is within a selected range of pressures or above or below a selected range of pressures. Control unit 50 responds to the pressure signal by (1) transmitting a signal to incrementally close valve 310A when pressure sensor 312A indicates a pressure that is above the selected range of pressures or by (2) transmitting a signal to incrementally open valve 310A when pressure sensor 312A indicates a pressure that is below the selected range of pressures or by (3) transmitting a signal to the motor of blower 15 incrementally increase the supply of electrical power to the blower motor to increase the blower output if pressure sensor 312A indicates a pressure that is below the selected range of pressures and valve 310A is completely open.

System 10 may be connected to a type of mattress having transverse air chambers arranged in zones much like the arrangement shown in FIG. 1 and can be adapted to control the patient, mattress interface pressure to prevent the formation of bed sores. Control unit 50 could include an algorithm for converting sensed pressure to mattress, patient interface pressure. The mattress, patient interface pressure is the pressure of contact between the mattress surface and the body of the patient. If that pressure is too high, blood circulation under the patient's skin is restricted and the patient develops bed sores. Such an algorithm would require an input relating to the weight of the patient and would convert the measured back pressure from various zones of the mattress to an approximate mattress, patient interface pressures. Control unit 50 would then receive pressure values from pressure sensors 312A, 312B, 312C and 312D and respond by either opening or closing valves 310A, 310B, 310C and 310D to maintain pressure in the corresponding chambers of mattress 400 to pressures that correspond to patient, mattress interface pressures that are just below the acceptable value. In this way control unit 50 can be adapted within the invention system to control pressure in a mattress to prevent bed sores.

The selected pressure range targeted by control unit 50 can be a constant set of values or a set of values that change with time depending on a pre-programmed mode that might be selected using control panel 70. Foe example, air mattress 400 might be configured differently from what is shown in FIG. 1, so that the set of chambers supplied by line 302A would all be on one lateral side of the air mattress. Control panel 70 might further have a mode selection option for a patient turning mode whereby chambers on alternate lateral sides of the air mattress are alternately inflated and deflated in unison in a cyclic fashion. In this case, the targeted pressure ranges would be constantly changing as sets of air chambers are inflated and deflated.

System 10 may also be connected to another type of mattress having transverse air chambers arranged in a transverse, alternating manner. A pulsating air mattress could be arranged where such alternating, staggered sets of chambers would be inflated and deflated in accordance with a programmed set of instructions.

Accordingly, system 10 is highly versatile and can be used to supply air to various types of air mattresses such as a rotational therapy mattress, a pulsating mattress or constant pressure mattress.

System 10 is also capable of supporting a cardiopulmonary resuscitation (CPR) mode wherein an air mattress connected to the system can be quickly deflated so that the patient may be lowered to a firm surface for CPR. The CPR mode is activated by turning gate member 200 of rotary valve 100 to a second position shown in phantom in FIG. 1. When in the second position, gate member 200 directs air in a deflation direction from air mattress 400 into intake 17 of blower 15 while air leaving blower 15 is directed through filter 30 to the outside environment. Because air from air mattress 400 is now routed to intake 17 of blower 15, air mattress 400 quickly deflates.

Figure 2:
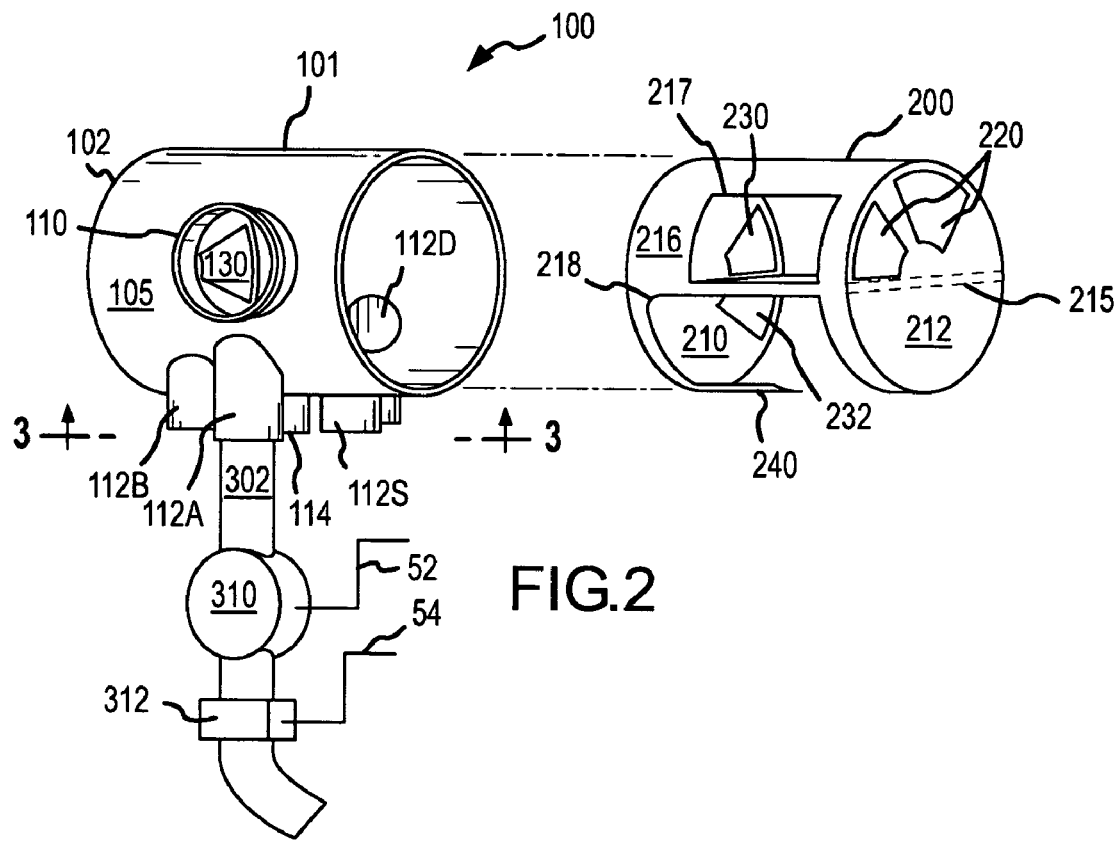
FIG. 2 is a perspective view of the rotary valve of the system of the present invention.
Figure 3:
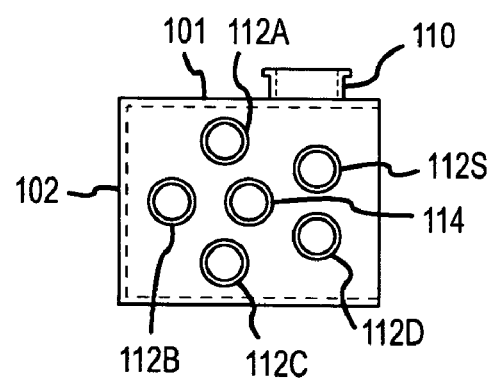
FIG. 3 is a bottom view of the rotary valve of the system of the present invention taken from plane 3—3 of FIG. 2.

The arrangement of rotary valve 100 is illustrated in detain in FIG. 2.

As can be seen in FIG. 2, rotary valve 100 includes a valve housing 101 and a gate member 200. Valve housing 101 has an open cylindrical shape and includes an outer wall 105 and a base wall 102. Outer wall 105 has an inlet port 110 that connects with exhaust port 19 of blower 15. Outer wall 105 of valve housing 101 also has air mattress supply ports 112S, 112A, 112B, 112C and 112D for supplying air to various sets of chambers of air mattress 400 shown in FIG. 1 as well as a continuous exhaust port 114. Air mattress supply ports 112S, 112A, 112B, 112C and 112D and exhaust port 114 are shown more clearly in FIG. 3 which is a view taken from plane 3—3 of FIG. 2. Base wall 102 of housing 101 has an outlet port 130. Outlet port 130 and intake port 110 are centered upon the same diametric plane of housing 101.

Gate member 200 is received by valve housing 101 so that it can rotate within valve housing 101. Gate member 200 has a first circular end wall 210 at one end, a second circular end wall 212 at the opposite end, a cylindrical wall 216 and a horizontal wall 215 that extends between and connects first end wall 210 and the second end wall 212. First end wall 210 of gate member 200 comes into close proximity or contact with base wall 102 of housing 101 when gate member 200 in inserted into housing 101. Second end wall 212 closes rotary valve 100 when gate member 200 in inserted into housing 101. Horizontal wall 215 divides gate member 200 into a first portion which is above horizontal wall 215 in FIG. 2 and a second portion which is below horizontal wall 215 in FIG. 2. Second end wall 212 has first ports 220 above horizontal wall 215. First ports 220 could easily be combined into one port. First ports 220 can be positioned anywhere in second end wall 212 above horizontal wall 215. First end wall 210 has a second port 230 positioned above horizontal wall 215 and a third port 232 positioned below horizontal wall 215. As can be better understood by referring to FIG. 1, ports 220 lead to filter 30 and the outside environment. Cylindrical wall 216 of gate member 200 is sized to fit within housing 101. An upper wall port 217 opens into the upper chamber of gate member 200 while a very extensive lower wall port 218 opens up almost all of the lower chamber of gate member 200. Although upper wall port 217 is shown in FIG. 2 as an opening in a substantially complete cylindrical wall 216, gate member 200 can still function even if upper wall port 217 is as extensive as lower wall port 218. With such an open configuration, gate member 200 presents first and second portions that are mostly bounded by the first and second end walls of gate member 200, horizontal wall 215 and cylindrical outer wall 105 of housing 101 when gate member 200 is inserted into housing 101.

The various ports and openings of valve housing 101 and gate member 200 are arranged so that the valve can operate in a first position in which pressurized air is delivered to the air mattress a second position in which air is pulled from the air mattress to quickly deflate the air mattress. Air mattress supply ports 112S, 112A, 112B, 112C and 112D and exhaust port 114 are positioned in a pattern that is adjacent to inlet port 110 so that when gate member 200 is tilted in the first position, air mattress supply ports 112S, 112A, 112B, 112C and 112D, exhaust port 114 and inlet port 110 are on one side of horizontal wall 215 of gate member 200 in communication with the second portion of the gate member.

When gate member 200 is in the first position, air can flow through inlet port 110 of housing 101, into the second portion of gate member 200 and then out through air mattress supply ports 112S, 112A, 112B, 112C and 112D and exhaust port 114. Also while gate member 215 is in the first position, second port 230 of gate member 200 is aligned with outlet port 130 of valve housing 101 (while third port 232 is blocked by base wall 102 of valve housing 101) so that outside air can flow through first ports 220 in second end wall 212, into the first portion of gate member 200, through second port 230 of gate member 200, through outlet port 130 of housing 101 and into the intake of blower 15. When gate member 200 is in the first, pressurizing position, air from blower 15 is routed to air mattress 400 shown in FIG. 1, while outside air is drawn in through filter 30 shown in FIG. 1 and into the intake of blower 15.

When gate member 200 is turned to a second position, horizontal wall 215 is interposed between inlet port 110 and air mattress supply ports 112S, 112A, 112B, 112C and 112D as well as exhaust port 114. When the gate member 200 is in the second position, third port 232 of gate member 200 aligns with outlet port 130 of housing 101 so that air is pulled in through air mattress supply ports 112S, 112A, 112B, 112C and 112D, through third port 232, then through outlet port 130 of housing 101 and into the intake of blower 15. Also when gate member 200 is in the second, blower exhaust air passes through inlet port 110 of housing 101 and out through first ports 220 into the outside environment (while second port 230 is blocked by base wall 102 of housing 101). When gate member 200 is in this second position, air is drawn out of air mattress 400 shown in FIG. 1 and blower exhaust is expelled into the outside environment through filter 30 shown in FIG. 1 causing air mattress 400 to quickly deflate. To facilitate the vacuum mode, it may also be advantageous to locate exhaust port 114 in an outside radial position such as in the location of air mattress supply port 112B shown in FIG. 3 and then to add a tab 240 to gate member 200 that only obstructs the relocated exhaust port 114 when gate member 200 is in the second position. This would stop air back flow through exhaust line 304 when the gate member is in the second, vacuum position. In the alternative, it may be advantageous to place a one way flapper valve in line exhaust line 304 to prevent such back flow when the system is operating in the rapid deflating vacuum mode.

Preferably, rotary valve 100 can be fashioned from injected molded plastic. It is preferable to mount gate member 200 in a spring biased manner so that gate member is pushed into housing 101 to make firm contact. Because gate member 200 is intended to be operated manually, it may also be advantageous to mount gate member 200 within housing 101 so that it can only move between the first and second positions. Moreover, it would be preferable to have corresponding protrusions and recesses in first end wall 210 of gate member 200 and base wall 101 of housing 101 respectively that engage each other when gate member 200 is in a first or a second position to provide an operator with tactile feed-back to indicate that rotary valve 100 is either in the first or the second position but not between the first or the second position.

It is to be understood that while certain forms of this invention have been illustrated and described, it is not limited thereto, except in so far as such limitations are included in the following claims and allowable equivalents thereof

The invention claimed is:

1. A system for supplying air and controlling the flow of air into and out of a plurality of chambers of a patient-supporting low air loss air mattress, the system comprising:
   a controllable blower having an intake port and an exhaust port;
   air supply lines leading to the chambers of the air mattress;
   pressure sensors operatively connected to the air supply lines; and
   a gate member, the gate member being operable from, and limited to, one of two positions by which the flow of air is selectively diverted, a first position in which air is permitted to flow substantially completely from the blower exhaust port to the chambers of the air mattress, and a second position in which the flow of air is routed substantially completely from the air mattress into the blower intake port, the system being configured to effect substantial and rapid evacuation of air from the air mattress when the gate member is in the second position, an amount of air flow being controllable from within the air supply lines.

2. The system as recited in claim 1, wherein the air supply lines have electrically controlled valves for controlling the amount of air that can flow therethrough.

3. The system as recited in claim 2, wherein the air supply lines have the pressure sensors interposed between the valves and the chambers of the air mattress for sensing the air pressure in the chambers of the air mattress.

4. The system as recited in claim 2, further comprising a programmable control unit connected to the blower, the pressure sensors, and the valves.

5. The system as recited in claim 4, wherein the control unit receives pressure signals from the pressure sensors and transmits a signal to incrementally close the valves in the air supply lines having an air pressure above the predetermined range of pressures.

6. The system as recited in claim 4, wherein the control unit receives pressure signals from the pressure sensors and transmit a signal to incrementally open the valves in the air supply lines having an air pressure below the predetermined range of pressures.

7. The system as recited in claim 6, wherein the control unit is able to transmit a signal to incrementally increase the supply of electrical power to the blower motor to increase the blower output if pressure in an air supply line is below a selected range of pressures and the valve in that line is completely open.

8. The system as recited in claim 7, the control unit is able to receive inputs for the height and weight of the patient, determine acceptable air mattress supply line back pressures corresponding to patient and mattress interface pressures given input values for patient weight and height, whereby the values may be controlled to maintain patient and mattress interface pressures that are below pre-determined values.

9. The system as recited in claim 1, wherein the means for directing air comprises a two-position rotary valve.

10. The system as recited in claim 9, wherein the rotary valve includes a housing defining an outlet port, an inlet port, and air mattress supply ports.

11. The system as recited in claim 10, wherein the housing inlet port communicates with the blower exhaust port, the air mattress supply ports communicate with the air supply lines leading to the chambers of the mattress, and the housing outlet port communicates with the blower intake port.

12. The system as recited in claim 9, wherein the gate member is rotatably received by a housing of the rotary valve in the first or second position, the housing defining an outlet port, an inlet port, and air mattress supply ports.

13. The system as recited in claim 12, wherein the gate member has one or more ports able to align with the valve housing inlet port when the gate member rotates in the first position, thereby allowing the gate member to communicate with the valve housing inlet port and air mattress supply ports, the blower intake to communicate with the outside environment, and the blower exhaust with the air mattress supply ports.

14. The system as recited in claim 12, wherein the gate member has one or more ports able to align with the valve housing outlet port when the gate member rotates in the second position, thereby allowing the gate member to communicate with the valve housing inlet port and the air mattress supply ports, the blower exhaust to communicate with the outside environment, and the blower intake with the air mattress supply ports.

15. A method for inflating and deflating a patient support air mattress, the method comprising providing a blower producing air flow in pneumatic communication with an internal chamber of the air mattress, the blower including an inlet and an outlet; inflating the mattress by directing the flow of air substantially completely to the mattress through a single inflation port of a valve housing in an inflation direction from the blower outlet; and deflating the mattress in a substantial and rapid manner by directing the flow of air substantially completely from the mattress through a single deflation port of the valve housing in a deflation direction to the blower inlet, configuring the valve to operate from just two operative positions for alignment with the single inflation port and the single deflation port respectively for controlling the flow of air to and from the mattress.

16. The method according to claim 15 wherein redirecting the flow of air with the two-position valve comprises removing the blower outlet from pneumatic communication with the air mattress internal chamber and placing the blower inlet in pneumatic communication with the air mattress internal chamber.

17. The method according to claim 16 wherein directing the flow of air in an inflation direction comprises placing the blower outlet in pneumatic communication with the air mattress internal chamber, and directing the flow of air in a deflation direction comprises placing the blower inlet in pneumatic communication with the air mattress internal chamber for rapid deflation.

18. An inflatable patient support apparatus comprising:
an inflatable mattress including an internal chamber,
an air transmission device operable to provide air flow into and out of the internal chamber, and
a three port valve controlling the air flow to inflate or deflate the mattress with the transmission device, the valve comprising a rotary valve, the valve being operable from, and limited to, one of two positions by which the flow of air is selectively diverted, a first position in which air is permitted to flow substantially completely from the air transmission device to the internal chamber of the mattress, and a second position in which the flow of air is routed substantially completely from the mattress into the air transmission device, the valve being configured to effect substantial and rapid evacuation of air from the mattress when the valve is in the second position, an amount of air flow being controllable from within the air supply lines.

19. The apparatus according to claim 18 wherein the air transmission device comprises a blower.

20. The apparatus according to claim 19 wherein the blower comprises a single direction blower.

21. The apparatus according to claim 18 further comprising a control unit, a plurality of sensors, and a plurality of pressure control valves, the mattress including a plurality of internal chambers, the pressure sensors providing pressure indication from the internal chambers to the control unit, and the control unit opening or closing the valves to change pressure inside the internal chambers.

22. The apparatus according to claim 18 wherein the multi-port valve is manually operated.

* * * * *